(12) United States Patent
Nussbaum et al.

(10) Patent No.: US 7,496,726 B1
(45) Date of Patent: Feb. 24, 2009

(54) CONTROLLING CONTENTION VIA TRANSACTIONAL TIMERS AMONG CONFLICTING TRANSACTIONS ISSUED BY PROCESSORS OPERATING IN INSISTENT OR POLITE MODE

(75) Inventors: Daniel S. Nussbaum, Cambridge, MA (US); Victor M. Luchangco, Cambridge, MA (US); Mark S. Moir, Hampton, NH (US); Ori Shalev, Giv'at Shmuel (IL); Nir N. Shavit, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 312 days.

(21) Appl. No.: 11/110,910

(22) Filed: Apr. 18, 2005

(51) Int. Cl.
*G06F 12/00* (2006.01)
*G06F 13/00* (2006.01)
*G06F 13/28* (2006.01)

(52) U.S. Cl. .................. 711/163; 711/151; 711/152; 711/147; 711/130; 711/144; 711/145; 711/119

(58) Field of Classification Search .............. None
See application file for complete search history.

(56) References Cited

U.S. PATENT DOCUMENTS

| 4,318,182 | A | * | 3/1982 | Bachman et al. | 718/105 |
| 4,858,116 | A | * | 8/1989 | Gillett et al. | 711/155 |
| 5,428,761 | A | * | 6/1995 | Herlihy et al. | 711/130 |
| 5,918,248 | A | * | 6/1999 | Newell et al. | 711/147 |
| 6,460,124 | B1 | * | 10/2002 | Kagi et al. | 711/163 |
| 6,694,390 | B1 | * | 2/2004 | Bogin et al. | 710/53 |
| 2002/0004851 | A1 | * | 1/2002 | Matena et al. | 709/315 |
| 2005/0177831 | A1 | * | 8/2005 | Goodman et al. | 718/100 |

* cited by examiner

*Primary Examiner*—Hong Kim
*Assistant Examiner*—Marwan Ayash
(74) *Attorney, Agent, or Firm*—Park, Vaughan & Fleming LLP

(57) ABSTRACT

A system for controlling contention between conflicting transactions in a transactional memory system. During operation, the system receives a request to access a cache line and then determines if the cache line is already in use by an existing transaction in a cache state that is incompatible with the request. If so, the system determines if the request is from a processor which is in a polite mode. If this is true, the system denies the request to access the cache line and continues executing the existing transaction.

21 Claims, 3 Drawing Sheets

CONTROLLING CONTENTION VIA TRANSACTIONAL TIMERS AMONG CONFLICTING TRANSACTIONS ISSUED BY PROCESSORS OPERATING IN INSISTENT OR POLITE MODE

BACKGROUND

1. Field of the Invention

The present invention relates to techniques for improving the performance of computer systems. More specifically, the present invention relates to a method for controlling contention between conflicting transactions in a transactional memory system.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, the requirements of concurrent software can diminish these gains in performance. In concurrent software, it is important to guarantee that one thread cannot observe partial results of an operation being executed by another thread. These guarantees are necessary for practical and productive software development because without them, it is extremely difficult to distinguish the interactions of concurrent threads.

One method to provide these guarantees is to use locks to prevent other threads from accessing the data affected by an ongoing operation. Such use of locks gives rise to well known problems in terms of software engineering and in terms of performance. First, the right balance of locking must be achieved, so that correctness is maintained, while ensuring that the use of a particular lock does not prevent access to an unnecessary amount of unrelated data which can cause other threads to wait when they do not have to wait. Furthermore, if proper care is not taken, the use of locks can result in deadlock, causing software to freeze up. While well understood, these problems are pervasive in concurrent programming, and addressing them often results in code that is more complicated and expensive.

No matter how carefully used, locks always have the problem that if a thread is delayed while holding a lock, then other threads must wait for at least the duration of that delay before being able to acquire that lock. In general, operating systems and other runtime environments cannot avoid this problem because they cannot accurately predict how long a particular lock will be held, and they cannot revoke the lock without jeopardizing correctness.

Another method to provide these guarantees is the obstruction-free algorithm approach, which provides weak progress guarantees algorithmically and hooks to a software-controlled contention-management system. Unfortunately, it is considerably more difficult to implement something in an obstruction-free manner without transactional memory than with transactional memory.

Another method is to use transactional memory. Transactional memory allows the programmer to think as if multiple memory locations can be accessed and/or modified in a single atomic step. Thus, in many cases, it is possible to complete an operation with no possibility of another thread observing partial results, even without holding any locks. This significantly simplifies the design of concurrent programs.

Transactional memory can be implemented in hardware with the hardware directly ensuring that a transaction is atomic. It can also be implemented in software that provides the illusion that the transaction is atomic, even though in fact it is executed in smaller atomic steps by the underlying hardware. A hybrid approach can be used for taking advantage of the best features of hardware and software transactional memory. This hybrid approach first attempts a transaction in hardware, and if it fails some number of times, it retries the transaction in software. Note that transactions executed in software are significantly slower than those executed in hardware, so it is preferable that transactions succeed in hardware as often as possible.

Most designs for hardware transactional memory and related mechanisms use the same basic approach, building on the system's caches and cache coherence protocols to effect atomic transactions. While executing a transaction, when the processor acquires either shared or exclusive ownership of a cache line in order to access a variable stored in that cache line, the cache line is marked as transactional. Stores executed during the transaction are recorded in a store buffer, and do not become visible to other processors before the transaction successfully commits. If the processor retains ownership of all transactional cache lines until the transaction completes, the processor can then atomically commit the transaction by transferring values from the store buffer into the corresponding cache lines before relinquishing ownership of any of the transactional cache lines. If the processor loses ownership of a transactional cache line before the transaction completes, however, the transaction is aborted, and must be retried.

Unfortunately, when a processor that implements transactional memory receives a request for a cache line that it owns, it immediately relinquishes the cache line, and aborts the current transaction if the cache line is marked as transactional. Note that if the transaction is then retried, it is likely to request the same cache lines it accessed previously. This behavior can cause a "ping pong" effect, in which two or more transactions repeatedly cause each other to abort, leading to livelock.

This livelock problem can be addressed by various contention control techniques. One such technique is to "backoff" by making a thread wait for some time before retrying an aborted transaction, in the hope that other threads can make progress in the meantime. If a thread's transaction fails repeatedly, it can increase its waiting time between each retry. This way, the hope is that eventually contention is reduced sufficiently for transactions to commit.

While backoff can be effective in some cases, it is has a number of drawbacks, including the need to tune backoff parameters, and being ineffective when faced with a mix of short and long transactions. More general contention control mechanisms can be employed, in which threads share information about their transactions in order to better control which threads back off when, and for how long. Nevertheless, the degree of contention control possible with most previous transactional memory designs is limited. A contended-with transaction is always aborted, so the only possibility for managing contention is to attempt to avoid it altogether by delaying entire transactions.

Transactional Lock Removal (TLR) is another technique that aims to address the issue of deciding what to do when there is contention for a cache line. TLR allows critical sections protected by locks to be executed atomically without acquiring the lock, thereby allowing multiple threads to execute critical sections protected by the same lock concurrently when they do not conflict. Note that TLR is not transactional memory because it does not provide an interface for transactional programming. Nevertheless, the underlying mechanisms used by TLR to ensure atomicity are similar to those in transactional memory designs like.

When a processor executing a transaction using TLR receives a request for a cache line that is marked as transactional, it does not necessarily abort the current transaction immediately. Instead, TLR can effectively queue such requests, and continue to execute the current transaction, hopefully to completion. Notice that such a scheme must deal with multiple outstanding requests and provisioning resources in each processor for the maximum number of possible requests may be excessive. One way to deal with this problem is to distribute the queue among the participating processors. This is achieved by exploiting a property of some cache coherence protocols in which ownership of a cache line and possession of that cache line do not necessarily coincide. When a processor receives a request for a cache line that it owns, it can grant ownership to the requestor immediately, but delay sending the data for the cache line until the current transaction has completed. Because the requester has become the owner, subsequent requests for the same cache line will be routed to the new owner, which can itself grant ownership to a subsequent requester, even before receiving the data. This way, a queue of requests is distributed amongst the participating processors, with each having to remember (for each transactional cache line) only the identity of the processor to which it granted ownership. The decision between immediately responding to a request for a transactional cache line, thus causing the current transaction to fail, and deferring a request in the hope that the current transaction can succeed is made based on a timestamp-based priority scheme. This scheme can result in deadlock, so a special mechanism for dealing with this problem is required.

The TLR technique has several drawbacks. First, it is applicable only in conjunction with cache coherence protocols in which ownership of a cache line and possession of its data can be held separately. Second, it hardcodes a single strategy for dealing with contention, which may be effective for some workloads but ineffective for others. Finally, the approach devotes significant hardware resources and complexity to attempting to ensure lock-free execution. However, it does not in general achieve this goal, because some transactions will exceed the resources of the cache, requiring the scheme to fall back on the original approach of acquiring the lock.

The disadvantages of the TLR approach are partly due to the fact that TLR is not a transactional memory implementation. It is intended to improve the performance of existing lock-based code. Therefore, there is no opportunity for software to exploit knowledge of the particular application, or to adapt to current load and conditions.

Yet another technique is transient blocking synchronization (TBS), which proposes a middle ground between non-blocking and blocking approaches to synchronization. In TBS, one thread can block another, but only for a fixed amount of time, thus avoiding the long delays associated with standard blocking techniques. In TBS, a processor can have exclusive control of a resource (for example a memory location) for an amount of time it predicts will be sufficient to complete its operation. The processor holds a lease on the location for this period. In contrast to simple blocking approaches, if the lease expires without completion, the resource can be revoked without violating correctness. However, the performance of TBS-based proposals suffer because cache-based TBS implementation suitable for constructing transactional memory have not been proposed yet.

Hence, what is needed is a method and an apparatus to facilitate less expensive and more flexible contention control between conflicting transactions in hardware transactional memory for shared-memory multiprocessors without the above-described problems.

SUMMARY

One embodiment of the present invention provides a system for controlling contention between conflicting transactions in a transactional memory system. During operation, the system receives a request to access a cache line and then determines if the cache line is already in use by an existing transaction in a cache state that is incompatible with the request. If so, the system determines if the request is from a processor which is in a polite mode. If this is true, the system denies the request to access the cache line and continues executing the existing transaction.

In a variation on this embodiment, if the request is not from a processor in polite mode, but instead is from a processor which is in an insistent mode, the system grants the request to access the cache line. If the request to access the cache line is associated with a transaction, the system grants the request to access the cache line and additionally marks the requestor's cache line as transactional.

In a variation on this embodiment, while determining if the request is from a processor in polite mode, the system examines a transaction timer that specifies an amount of time during which the processor will deny requests to access cache lines which are marked as transactional. If the processor is in the polite mode and the transaction timer for the existing transaction has not expired, the system denies the request to access the cache line if the cache line is marked as transactional. On the other hand, if the processor is in the polite mode and the transaction timer for the existing transaction has expired, the system grants the request to access the cache line. If the request to access the cache line is granted and is associated with a transaction, the system marks the requestor's cache line as transactional.

In a variation on this embodiment, if the cache line is not in use by the existing transaction in a cache state that is incompatible with the request, or if the request is from a processor which is not in polite mode, the system grants the request to access the cache line.

In a variation on this embodiment, if the request is granted and if the request is associated with a transaction, the system marks the requestor's cache line as transactional.

In a variation on this embodiment, if the request to access the cache line is a store operation, granting the request involves taking exclusive ownership of the cache line. On the other hand, if the request to access the cache line is a load operation, granting the request involves taking shared ownership of the cache line.

In a variation on this embodiment, denying the request to access the cache line involves issuing a negative acknowledgment to the requesting processor.

In a variation on this embodiment, if the request is a store to a cache line which is marked as transactional (or a store that causes a cache line to be installed in a local cache and to be marked as transactional), the system records a value for the store instruction in a store buffer. The value for the store instruction in the store buffer is not visible to other processors before the transaction successfully commits. If the transaction successfully completes, transactional stores in the store buffer are atomically committed to the cache. On the other hand, if the transaction aborts, transactional stores are flushed from the store buffer.

In a variation on this embodiment, a load instruction or a store instruction includes a bit which indicates whether the processor that generated the request is in a polite transaction mode or an insistent transaction mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Transactional Memory

The following disclosure presents an approach for implementing transactional memory that allows simple contention control mechanisms to be built into hardware to deal with common cases fast, but also provides flexible means for software to take over and manage contention when the simple built-in hardware mechanisms (if any) are not successful in completing a transaction.

Figure 1:
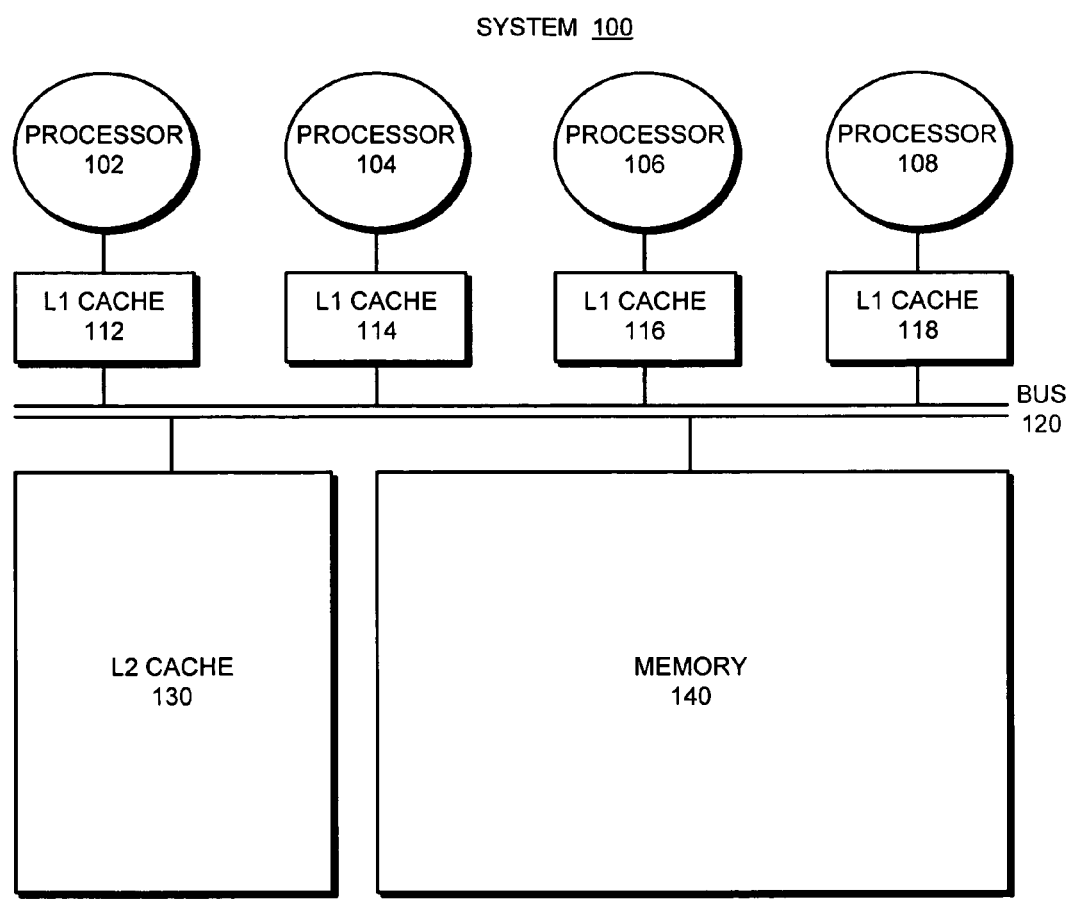
FIG. 1 illustrates a multiprocessor system in accordance with an embodiment of the present invention.

FIG. 1 illustrates a multiprocessor system 100 in accordance with an embodiment of the present invention. Multiprocessor system 100 includes processors 102-108 coupled to L1 caches 112-118 respectively. L1 caches 112-118 are coupled to bus 120. L2 cache 130 and memory 140 are also coupled to bus 120. In the embodiment of the present invention illustrated in FIG. 1, L2 cache 130 is shared between processors 102-106.

Figure 2:
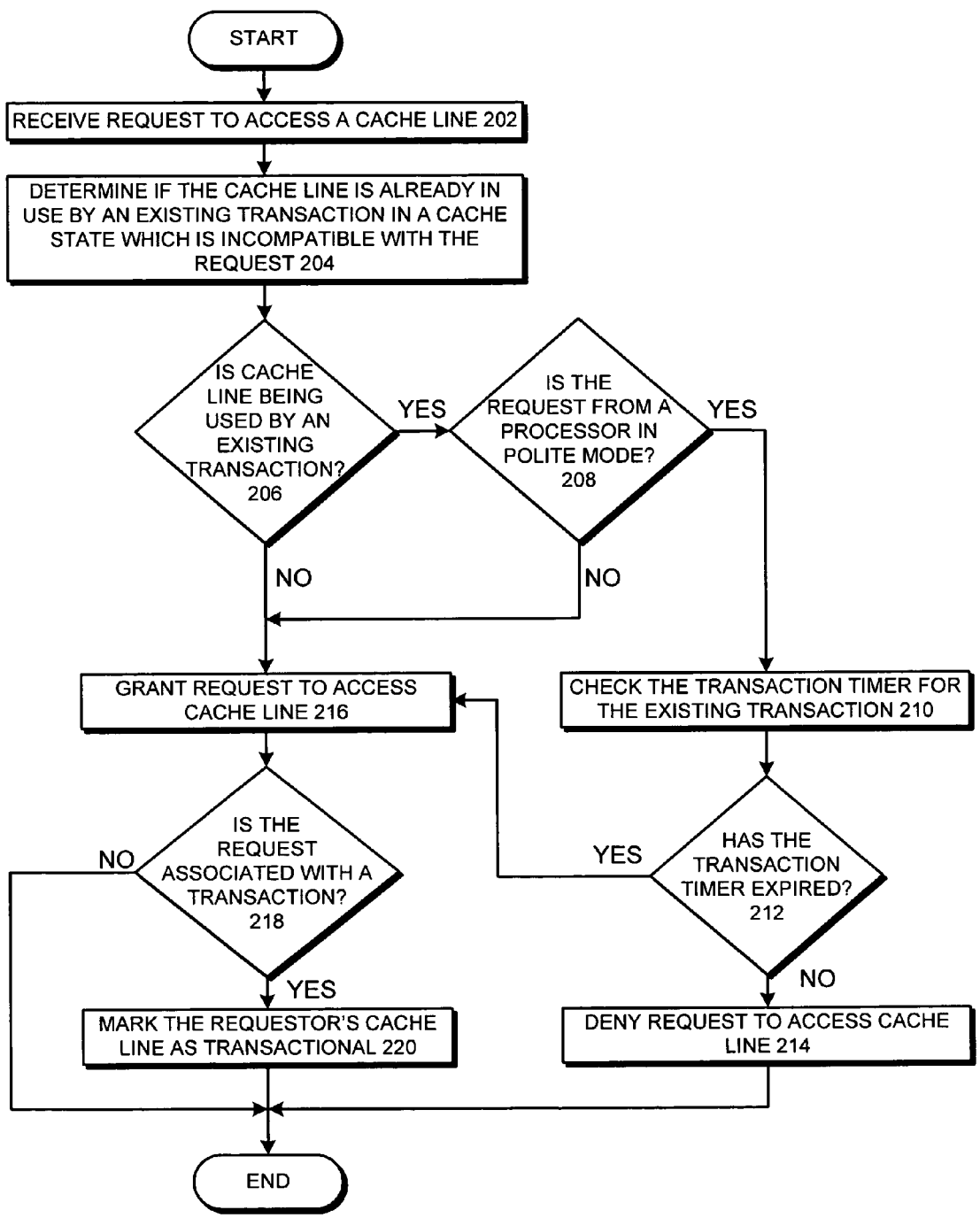
FIG. 2 presents a flowchart illustrating the process of controlling contention between conflicting transactions in a transactional memory system in accordance with an embodiment of the present invention.

FIG. 2 presents a flowchart illustrating the process of controlling contention between conflicting transactions in a transactional memory system in accordance with an embodiment of the present invention. The process starts when the processor receives a request to access a cache line (step 202). The processor then determines if the cache line is already in use by an existing transaction in a cache state which is incompatible with the request (step 204). If the cache line is being used by an existing transaction (step 206) and if the request is from a processor in polite mode (step 208), the processor checks the transaction timer for the existing transaction (step 210). If the transaction timer has not expired (step 212), the processor denies the request to access the cache line (step 214). On the other hand, if the cache line is not being used by an existing transaction (step 206), or if the request is from a processor not in polite mode (step 208), or the transaction timer has expired (step 212), the processor grants the request to access the cache line (step 216). If the request for the cache line is associated with a transaction (step 218), the processor marks the requestor's cache line as transactional (step 220).

A transaction can be started by means of a begin-transaction instruction. When a transaction is running, any loads or stores that it issues mark their associated cache lines as transactional. While a transaction is running, its store operations write their results into a local store buffer, hiding them from the outside world until the transaction commits. Eventually, a transaction either commits, exposing the hitherto hidden data in its store buffer to the outside world, or aborts, throwing away the contents of the store buffer.

Consistent with the obstruction-free philosophy, rather than attempting to guarantee progress to transactions in the face of contention, requests for transactional cache lines are allowed to abort the current transaction, but the local processor is also allowed to refuse to yield the requested cache line under some circumstances, thus allowing the current transaction to continue execution. Rather than attempting to queue requests in order to achieve a strong progress guarantee such as lock-freedom, a processor is allowed to explicitly deny a request for a cache line. Such approaches are described as NACK-based approaches (NACK is short for "negative acknowledgement"). A processor that receives a NACK in response to a request for a cache line has the option of retrying the request at a later time, or immediately aborting the local transaction, or perhaps retrying for some time, and then aborting. These decisions can be made based on a variety of factors, and the decision can be made either by hardware or software, or a combination of the two. A useful approach is to implement some simple strategies in hardware, while providing means for application-specific and/or adaptive software code to take control when these simple mechanisms fail to complete a transaction. A variety of combinations of hardware and software mechanisms are consistent with this invention.

The TBS approach suggests that a processor can have exclusive control of a resource (for example a memory location) for an amount of time it predicts will be sufficient to complete its operation. The processor is said to hold a lease on the location for this period. In the event that the lease expires without such completion, the resource can be revoked without violating correctness (in contrast to simple blocking approaches). The mechanisms in TBS are quite different from the present invention. In particular, when using the LLS instruction, those techniques depend on accurate lease expiration times for performance and correctness. The present invention uses lease-like techniques only as a contention control mechanism—accuracy of timing is not used to enforce correctness.

The ability for a processor to deny requests for cache lines must clearly be used with care. A transaction should not have its requests denied forever. The present invention supports flexible contention control, so that transactions can dynamically make decisions about when requests can be denied and when they should be honored. Such contention control may be implemented in hardware, in software, or both. A useful approach will be to build simple contention control mechanisms into hardware, and provide hooks to software contention control mechanisms when the simple hardware mechanisms are ineffective. Furthermore, it is important that software contention mechanisms have the ability to override hardware ones.

To allow software contention control mechanisms to override hardware ones, processors can have two modes: "polite" and "insistent." Furthermore, a transaction timer can be added, which is started when a transaction begins. Until the timer expires, the transaction denies a request from a processor executing in polite mode, but always grants a request from one executing in insistent mode. After the timer expires, all requests are granted. A request from a load or store executed in insistent mode cannot be denied, even by a transaction whose timer has not yet expired.

Control can be given to a software contention manager in the event that hardware is unable to make progress for a transaction. In some cases, this can be achieved without aborting the current transaction, so the software contention manager has the possibility to resume the transaction, possibly after coordinating with other transactions and/or waiting for some time. The software contention manager can receive various information from the hardware about the current transaction, and about the reason for transferring to software control. The contention manager can examine condition codes that contain information about the current transaction and the reason for trapping to software, and it can choose to abort or, in some cases, resume the current transaction. Furthermore, it can also switch between polite and insistent modes before resuming. For example, if requests made for cache lines on behalf of a transaction are repeatedly denied, the contention manager can switch to the insistent mode, so that when the transaction resumes, its requests can no longer be denied.

In such generic transactional memory designs, contention between two transactions is detected when one of them (the requester) issues a load or store operation whose target is already in use by the other (the requestee) in an incompatible mode. For example, the requestor is performing a load, but the requestee owns the requested cache line exclusively. In a generic transactional memory implementation, the requestee will immediately abort its transaction and grant the requested cache line to the requester. The present invention offers other alternatives, including:

1. Denying the request (by sending a NACK response) and continue execution of the current transaction
2. Granting the request, but subsequently regaining ownership of the cache line and resuming the transaction. In this case, the processor must ensure that the transaction semantics can still be guaranteed, for example, by checking that the cache line contains the same data it did previously.

The present invention allows a software contention manager to control processors' behavior in order to choose between these various options.

A processor that has a request denied must react to this denial. One possibility is for the hardware to retry the request, possibly after a short delay. However, a good design would eventually have the requesting processor trap to a software event handler, which would implements part of a contention manager.

The principal differences between a generic design and the design described here for concreteness are the following:

1. NACKs—A processor can deny another processor's request for a cache line by responding with a NACK (Negative ACKnowledgement) message.
2. Modes—Memory instructions executed by a transaction run in one of two modes: polite and insistent. Requests generated in insistent mode cannot be denied.
3. Transaction Timer—A processor's transaction state includes a transaction timer; the processor denies all polite requests until the timer expires;
4. Trapping to software control—Various events, including a request being denied, or a transactional cache line being evicted or downgraded cause traps to software event handlers. Event handlers can perform contention control, control the mode of the processor, resume the transaction, abort the transaction, etc.

In a variation on this embodiment, in order to decide whether to grant or deny requests for a cache line marked as transactional, priorities are associated with transactions and messages.

In a variation on this embodiment, the techniques can be applied to multiprocessor systems based on different arrangements. For example, in a chip multiprocessor, multiple threads might share a single L2 cache. In such systems, the generic transactional memory implementation has a transactional status bit or bits on each cache line for each thread context sharing the cache. It is straightforward to apply our invention to such systems. Transactional state such as an indication of a transaction being active, transaction timer, transaction mode, etc. would also be replicated per thread context.

Cache Evictions

Also as with generic transactional memory implementations, a transaction runs smoothly as long as all cache lines that have been marked as transactional remain resident in the cache. Threats to a transaction's integrity are detected locally any time a transactional cache line is evicted (or downgraded) from the cache for any reason.

A cache line can be evicted as a result of the interaction between the locally running application's memory access pattern and the cache's size and geometry. These evictions cause capacity (size) or conflict (geometry) misses. Because such evictions can cause a transaction to lose required atomicity guarantees, the processor is notified of capacity/conflict evictions when they occur.

Alternatively, a cache line can be evicted/downgraded in response to a request from another processor. When an invalidation request from a remote processor (requester) arrives at a local cache (requestee), the fulfillment of which would evict/downgrade a transactional cache line from the local (requestee's) cache, a generic transactional memory implementation would yield the requested cache line and abort the local transaction. This is where the present invention departs from the generic one. There are two choices:

1. Deny the contending memory request by responding with a NACK message. In this case, the remote processor is informed of the contention, and must take appropriate measures to deal with it.
2. Evict (or downgrade) the cache line, informing the local processor that the currently running transaction has experienced contention associated with that cache line. In this case, the local processor must take appropriate measures to deal with the contention.

In either case, either the requestor is denied a cache line that it needs, or the requestee loses one that it needs, and the affected transaction must take appropriate measures to deal with the contention. The simplest response is for the affected transaction to abort itself, but this is not always necessary. The affected transaction might instead try to re-issue a denied request or reacquire and revalidate the cache line that it lost, subsequently continuing execution of the affected transaction.

The present invention allows the choice between denying the requestor and yielding the requested cache line based on the type of request from the remote processor and the state of the local processor.

A processor executing a transaction can be in one of two modes: polite and insistent. The mode in which a memory access instruction is executed determines how a cache line request it generates is treated. If the requestor is executing in polite mode and the requestee is running a transaction whose transaction timer has not expired, a NACK is returned in response to the contending request. If the requestee's transaction timer has expired, or if the requestor is executing a transaction in insistent mode or the requestee is not executing a transaction at all, the request is fulfilled normally, and the requestee is informed of the contention if it is executing a transaction.

Events that threaten the integrity of a transaction, including (among other things) NACKs returned in response to polite memory requests and evictions/downgrades of transactional cache lines from the requestee's cache, cause the affected transaction to trap to an event handler. The event handler's code is logically part of the contention manager. There are a wide range of possible techniques for coordinating transactions in order to manage contention between them. Related inventions propose contention managers for software transactional memory. However, here techniques are presented for allowing hardware transactional memory implementations to be combined with dynamic and programmer-controlled contention-management techniques. Contention managers, embodied at least in part in the event handlers, can use a variety of techniques for coordinating transactions to decide on a course of action. Possible actions include aborting a transaction that is threatening the local transaction, aborting the local transaction, backing off for some time before retrying, changing the processor's mode (from polite to insistent or vice versa), etc.

Requests and Responses

Several cases exist for requests and responses for cache lines.

1. The requestee has a cache line in shared or exclusive mode, but is not transactional. The requestee issues a non-transactional request (shared or exclusive). Response: The request is always granted. If requestor wants shared (read) access and the requestee has a cache line in exclusive mode, the requestee must downgrade its cache line to shared before the requester gets access to the data. The requester writes the data back to memory if it is a write-back protocol and if the cache line is dirty. If the requestor wants exclusive (write) access to the data, the requestee must invalidate its cache line (potentially writing back the data, depending on the protocol and the state of the line) before the requestee gets access.

2. The requestee has a cache line in shared or exclusive mode, but is not transactional. The requester issues a "polite" or "insistent" transactional request (shared or exclusive). Response: The request is always granted. The requester adds the cache line containing the requested data to its cache (shared or exclusive mode, depending on request), marking the new cache line as transactional.

3. The requestee has cache line in shared mode and is transactional. The requestor issues a "polite" or "insistent" transactional request in shared mode. Response: The request is granted. The requester adds the cache line containing the requested data to its cache (shared mode), marking the new cache line as transactional.

4. The requestee has a cache line in exclusive mode and is transactional. The requestor issues a "polite" transactional request in shared or exclusive mode. Response: If the requestee does not have a transaction timer, or if such a timer exists, but it has not yet expired, request is denied (NACKed). The requestor can choose what to do next, perhaps waiting and trying again later or aborting its transaction, or perhaps doing something else. Otherwise, the request is granted. The requester adds the cache line containing the requested data to its cache (shared or exclusive mode), marking the new line as transactional. The requestee's transaction is aborted.

5. The requestee has a cache line in exclusive mode and is transactional. The requestor issues an "insistent" transactional request in shared or exclusive mode. Response: The request is granted. The requestor adds the cache line containing the requested data to its cache (shared or exclusive mode), and marks the new cache line as transactional. The requestee's transaction is aborted.

6. The requestee has cache line in shared or exclusive mode and is transactional. The requestor issues a "polite" transactional request in exclusive mode. Response: If the requestee does not have a transaction timer, or if such a timer exists, but it has not yet expired, the request is denied (NACKed). The requester can choose what to do next, perhaps waiting and trying again later or aborting its transaction, or perhaps doing something else. Otherwise, the request is granted. The requestor adds the cache line containing the requested data to its cache (shared or exclusive mode), marking the new line as transactional. The requestee's transaction is aborted.

7. The requestee has a cache line in shared or exclusive mode and is transactional. The requestor issues an "insistent" transactional request in exclusive mode. Response: The request is granted. The requester adds the cache line containing the requested data to its cache (shared or exclusive mode), and marks the new line as transactional. The requestee's transaction is aborted.

Instruction Descriptions begin-transaction- . . . <trap-addr>, <transaction-time>: Start a transaction. A transaction has a timer which is initialized by the <transaction-time> argument to a begin-transaction instruction and can be changed by the set-transaction-timer instruction. Before the timer expires, polite memory requests coming from other processors are NACKed, causing no change in state to the local cache. Once the timer expires, the transaction continues to run, but now, even polite memory operations that would interfere with the local transaction cause it to trap to <trap-addr>. As with generic transactional memory implementations, when a transaction is active, load instructions acquire shared ownership of the associated cache line; store instructions acquire exclusive ownership. The actions performed by store instructions executed by a transaction are not committed to the memory system unless a successful commit instruction for that transaction is executed. There are two distinct flavors of begin-transaction instructions: begin-transaction-polite and begin-transaction-insistent. The former starts a transaction running in polite mode; the latter starts a transaction in insistent mode. A running transaction can change modes via the set-transaction-mode-polite and set-transaction-mode-insistent instructions.

When executing a transaction in polite mode, load and store instructions are all polite. In polite mode, if the referenced location is transactional in some other cache, load/store instructions may be NACKed; NACKed loads return no value, NACKed stores have no effect.

When executing a transaction in insistent mode, load and store instructions are more aggressive than those issued in polite mode, causing a requestee's cache line to be evicted (or downgraded) from its cache without regard to whether the requestee has a transaction that needs the line or not. If the requestee loses a cache line that is needed by a running transaction, the requestee traps to its <trap-addr> specified when that transaction began. In the simplest case, the requestee would abort its transaction at that point.

An alternative to having the polite/insistent modes while still maintaining the distinction between the two is to use a bit in every load/store instruction.

set-transaction-mode-polite: Sets the mode of the current transaction to polite.

set-transaction-mode-insistent: Sets the mode of the current transaction to insistent.

et-transaction-mode: Returns the current transaction's mode (polite or insistent).

set-transaction-timer <transaction-time>: Sets the transaction timer for the current transaction to be <transaction-time> cycles into the future.

get-transaction-timer: Returns the expiration time for the current transaction.

commit-transaction: If unsuccessful, traps to the <trap-addr> specified when the transaction began. If successful, commits memory state to the memory system by flushing contents of the store buffer to the cache, along with committing the speculative register state if the processor can support it. This instruction differs from a generic transactional memory implementations by virtue of the fact that commit failure does not automatically abort the transaction. Instead, it traps to <trap-addr>, allowing the software system the possibility of recovery, depending on the reason for the failure.

abort-transaction <abort-addr>: Unrolls memory state by throwing away the contents of the store buffer and reverting speculative register state if the processor can support such functionality. It also causes a jump to <abort-addr>. If an abort instruction is executed when a transaction is not active, it simply branches to <abort-addr>. This makes it easier to write the trivial event handler, which always just aborts (since return-from-trap can return you to <trap-addr> without an active transaction).

Event Handling

Generally, a program learns of events that may result in transaction failure by virtue of the fact that such events cause the processor to trap to the <trap-addr>. In the simplest case, the transaction aborts at that point. In some cases, it may be possible to recover from the trapping event, resuming execution from the point where the trap was taken. For example, if the trap was caused by a NACK response from another processor, the event handler may choose to retry the memory instruction that provoked that NACK after a short backoff, and if successful, the transaction can resume execution. A variety of circumstances exist under which resumption of the transaction is allowable, and information about various conditions can be used to distinguish these situations.

A number of conditions cause a running transaction to trap to its event-handler:
 1. Receiving a NACK from a polite load or store request.
 2. Receiving notification from the memory system that a transactional cache line has been evicted/downgraded from the cache.
 3. Receiving notification that the store buffer is full.
 4. Executing a begin-transaction instruction (in realizations that do not support nested transactions).
 5. Return from any kind of interrupt or trap (context switch is a subset of this category).

In a variation on this embodiment, any failure event aborts the transaction immediately, unrolling memory state and jumping to <abort-addr>. In other words, no <trap_addr> is used.

In a variation on this embodiment, the hardware automatically retries NACKed instructions one or more times, perhaps with some delay between retries, before failing/aborting.

Errors

If the following instructions are executed when a transaction is not in progress, they produce errors similar to what happens when an illegal instruction is executed.
 set-transaction-mode-polite
 set-transaction-mode-insistent
 get-transaction-mode
 set-transaction-timer <transaction-time>
 get-transaction-timer
 commit-transaction Interrupt/Trap Handling Upon return from the interrupt, the interrupted transaction is ideally informed that its integrity may have been violated. This is accomplished by having the interrupt's return address be <trap-addr>. The event handler then decides how to proceed. For most interrupts/traps, the event handler will have no choice but to abort. However, for a few very simple traps, it is possible that the event handler will be able to resume the transaction where it was interrupted from.

Store Buffer

A store buffer can be used to buffer up the results of uncommitted store instructions, as is the case in other transactional memory implementations. Note that the store buffer must fulfill these requirements:
 1. Before a transaction commits, stores are collected in the store buffer—nothing gets out until the commit instruction is executed.
 2. Load instructions must be able to snoop the store buffer. If a hit is found, the value in the store buffer is what the processor gets. Otherwise, the load is forwarded on to the rest of the memory system.
 3. When a transaction commits, the contents of the store buffer can be released to the memory system. Since all associated entries are resident in the cache, one approach is to update the state of the store buffer to ensure atomicity. The stores will stream out to the next level of the memory system as if they were issued by normal instructions. Standard store buffer design ensures that loads from the local processor snoop the store buffer, so atomicity is maintained locally. Standard store buffer and coherence protocol design also ensures that an external invalidation request for a cache line that is held up in the store buffer will be held up until the entry is written out to the memory system. Another approach is to flush entries from the store buffer into the associated cache lines.

Figure 3:
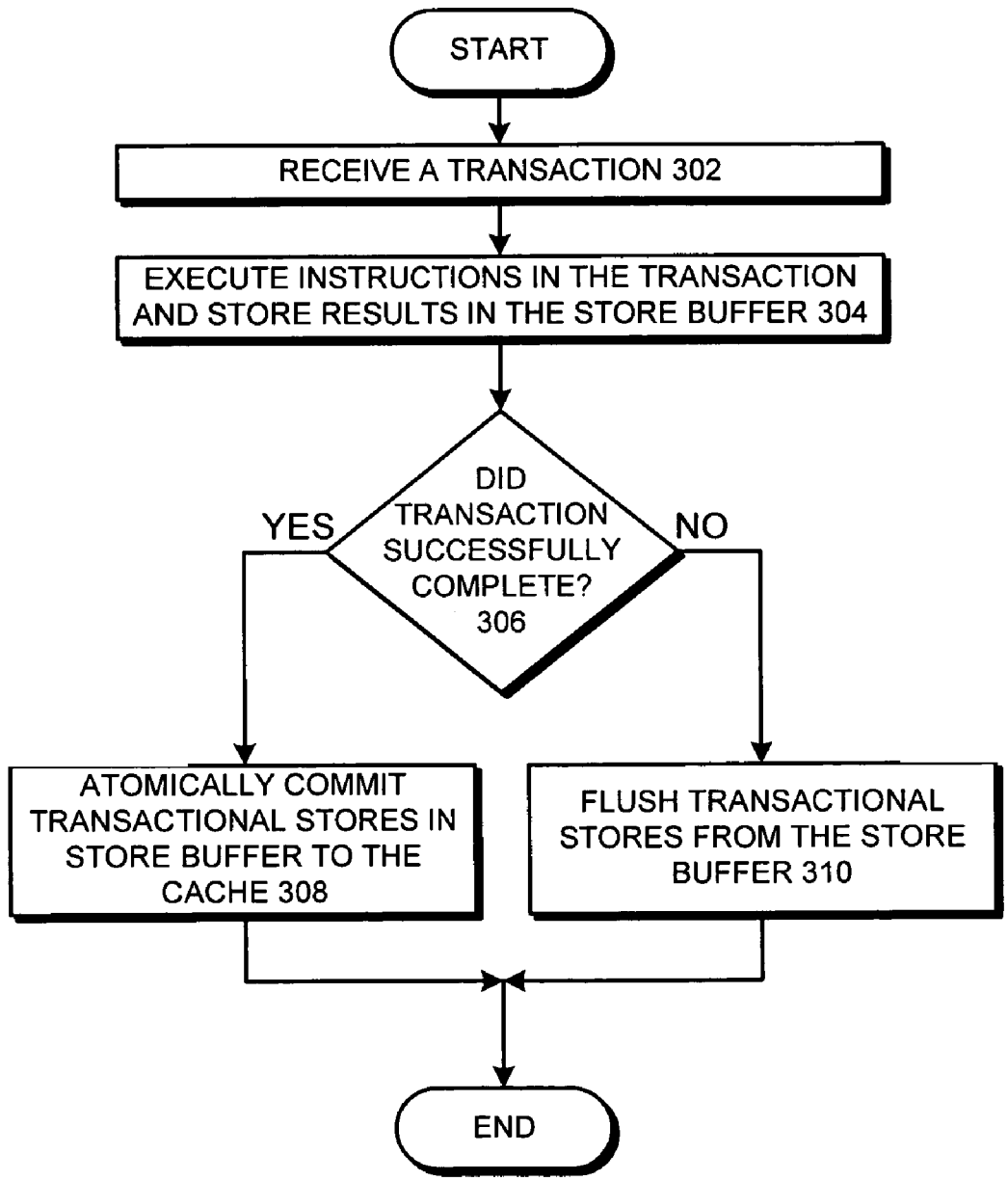
FIG. 3 presents a flowchart illustrating the process of managing a store buffer in accordance with an embodiment of the present invention.

FIG. 3 presents a flowchart illustrating the process of managing a store buffer in accordance with an embodiment of the present invention. The process starts when a transaction is received (step 302). The instructions in the transaction are executed and any results produced by those instructions are stored into the store buffer (step 304). If the transaction is completed successfully (step 306), the transactional stores in the store buffer are atomically committed to the cache line (step 308). Otherwise, the transactional stores are flushed from the store buffer (step 310). Note that if a transaction is aborted, the transaction does not complete successfully.

Additions to Cache Coherence Protocol

A polite bit is added to all requests and polite requests may be NACKed. Furthermore, NACK responses for polite memory requests have been added.

Interoperability with Non-Transactional Memory Operations

When a cache receives a request for a non-transactional memory operation, the cache behaves as if the request were an insistent request.

Condition Information

Processor registers are added so that the software can know what to do when at the trap/abort location(s). Enough information must be made accessible for the trap handler to know why it is executing:
 1. A transactional cache line got evicted/downgraded from the cache? If so, what's the address of the data that just got evicted/downgraded?
 2. Instruction failure (NACK)? If so, what's the address of the instruction that failed and the address of the data item whose access was NACKed?
 3. Transaction interrupted by trap or interrupt? There is usually no choice but to abort in this case. The details of what information is necessary here will vary depending on how the question "What happens on transaction failure?" is answered.

Upgrades: Often, a given memory location will be read before it is written within a single transaction. Generally, this can be handled exactly as it is when a store to a location follows a load to the same location in normal non-transactional execution. However, it should be noted that, while in non-transactional execution it is acceptable to relinquish the shared cache line, and subsequently reacquire it in shared mode, this is not generally acceptable when upgrading a cache line being accessed by a transaction because it jeopardizes the atomicity of the transaction.

Starvation issues are handled entirely by the contention manager in software. Note that the event handler is part of the contention manager.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling contention between conflicting transactions in a transactional memory system, comprising:
   receiving a request to access a cache line;
   determining if the cache line is already in use by an existing transaction in a cache state that is incompatible with the request; and
   if so,
      determining if the request is from a processor which is in a polite mode or an insistent mode; and
      if the processor is in a polite mode,
         determining whether the request has been denied a predetermined number of times; and
         if so,
            switching the processor from the polite mode to the insistent mode;
         if not,
            determining whether a transaction timer has expired, wherein the transaction timer specifies a predetermined time since the start of the existing transaction during which the processor will deny requests to access cache lines which are marked as transactional; and
            if not, denying the request to access the cache line if the cache line is marked as transactional;
      if the processor is in the insistent mode, granting the request to access the cache line.

2. The method of claim 1,
   wherein if the request to access the cache line is associated with a transaction, granting the request further involves marking the requestor's cache line as transactional.

3. The method of claim 1,
   wherein if the processor is in the polite mode and the transaction timer for the existing transaction has expired, the method further comprises granting the request to access the cache line; and
   wherein if the request to access the cache line is granted and is associated with a transaction, the method further comprises marking the requestor's cache line as transactional.

4. The method of claim 1, wherein if the cache line is not in use by the existing transaction in a cache state that is incompatible with the request, or if the request is from a processor which is not in polite mode, the method further comprises granting the request to access the cache line.

5. The method of claim 4, wherein if the request is granted and if the request to access the cache line is associated with a transaction, the method further comprises marking the requestor's cache line as transactional.

6. The method of claim 4,
   wherein if the request to access the cache line is a store operation, granting the request involves taking exclusive ownership of the cache line; and
   wherein if the request to access the cache line is a load operation, granting the request involves taking shared ownership of the cache line.

7. The method of claim 1, wherein denying the request to access the cache line involves issuing a negative acknowledgment to the requesting processor.

8. The method of claim 1,
   wherein if the request is a store to a cache line which is marked as transactional (or a store that causes a cache line to be installed in a local cache and to be marked as transactional), the method further comprises recording a value for the store instruction in a store buffer;
   wherein the value for the store instruction in the store buffer is not visible to other processors before the transaction successfully commits;
   wherein if the transaction successfully completes, transactional stores in the store buffer are atomically committed to the cache; and
   wherein if the transaction aborts, transactional stores are flushed from the store buffer.

9. The method of claim 1,
   wherein a load instruction or a store instruction includes a bit which indicates whether the processor that generated the request is in a polite transaction mode or an insistent transaction mode.

10. The method of claim 1,
    wherein denying the request to access the cache line immediately aborts the transaction associated with the request; and
    wherein the processor retries a denied request to access the cache line one or more times before aborting the transaction.

11. An apparatus for controlling contention between conflicting transactions in a transactional memory system, comprising:
    a processor;
    a cache; and
    a memory;
    a contention-management mechanism; and
    wherein the contention-management mechanism is configured to,
       receive a request to access a cache line,
       to determine if the cache line is already in use by an existing transaction in a cache state that is incompatible with the request,
       if so, the contention-management mechanism is configured to determine if the request is from a processor which is in a polite mode or an insistent mode; and
       if the processor is in the polite mode, the contention-management mechanism is configured to:
          determine whether the request has been denied a predetermined number of times; and
          if so, the contention-management mechanism is configured to switch the processor from the polite mode to the insistent mode;
          if not, the contention-management mechanism is configured to:
             determine whether a transaction timer has expired, wherein the transaction timer specifies a predetermined time since the start of the existing transaction during which the processor will deny requests to access cache lines which are marked as transactional; and if the transaction time has not expired, the contention-management mechanism is configured to deny the request to access the cache line if the cache line is marked as transactional;

if the processor is in the insistent mode, the contention-management mechanism is configured to grant the request to access the cache line.

12. The apparatus of claim 11,
wherein if the request to access the cache line is associated with a transaction, granting the request to access the cache line further involves marking the requestor's cache line as transactional.

13. The apparatus of claim 11,
wherein if the processor is in the polite mode and the transaction timer for the existing transaction has expired, the contention-management mechanism is configured to grant the request to access the cache line; and
wherein if the request to access the cache line is granted and is associated with a transaction, the contention-management mechanism is configured to mark the requestor's cache line as transactional.

14. The apparatus of claim 11, wherein if the cache line is not in use by the existing transaction in a cache state that is incompatible with the request, or if the request is from a processor which is not in polite mode, the contention-management mechanism is configured to grant the request to access the cache line.

15. The apparatus of claim 14, wherein if the request is granted and if the request to access the cache line is associated with a transaction, the contention-management mechanism is configured to mark the requestor's cache line as transactional.

16. The apparatus of claim 14,
wherein if the request to access the cache line is a store operation, granting the request involves taking exclusive ownership of the cache line; and
wherein if the request to access the cache line is a load operation, granting the request involves taking shared ownership of the cache line.

17. The apparatus of claim 11, wherein denying the request to access the cache line involves issuing a negative acknowledgment to the requesting processor.

18. The apparatus of claim 11,
wherein if the request is a store to a cache line which is marked as transactional (or a store that causes a cache line to be installed in a local cache and to be marked as transactional), a store buffer is configured to record a value for the store instruction;
wherein the value for the store instruction in the store buffer is not visible to other processors before the transaction successfully commits;
wherein if the transaction successfully completes, transactional stores in the store buffer are atomically committed to the cache; and
wherein if the transaction aborts, transactional stores are flushed from the store buffer.

19. The apparatus of claim 11,
wherein a load instruction or a store instruction includes a bit which indicates whether the processor that generated the request is in a polite transaction mode or an insistent transaction mode.

20. The apparatus of claim 11,
wherein denying the request to access the cache line immediately aborts the transaction associated with the request; and
wherein the processor retries a denied request to access the cache line one or more times before aborting the transaction.

21. A computer system including a transactional memory system that controls contention between conflicting transactions, comprising:
a processor;
a cache;
a memory; and
a contention-management mechanism;
wherein the contention-management mechanism is configured to,
receive a request to access a cache line, and
to determine if the cache line is already in use by an existing transaction in a cache state that is incompatible with the request,
if so, the contention-management mechanism is configured to determine if the request is from a processor which is in a polite mode or an insistent mode; and
if the processor is in the polite mode, the contention-management mechanism is configured to:
determine whether the request has been denied a predetermined number of times; and
if so, the contention-management mechanism is configured to switch the processor from the polite mode to the insistent mode; and
if not, the contention-management mechanism is configured to:
determine whether a transaction timer has expired, wherein the transaction timer specifies a predetermined time since the start of the existing transaction during which the processor will deny requests to access cache lines which are marked as transactional; and
if the transaction time has not expired, the contention-management mechanism is configured to deny the request to access the cache line if the cache line is marked as transactional;
if the processor is in the insistent mode, the contention management mechanism is configured to grant the request to access the cache line.

* * * * *